United States Patent
Nakatsukasa et al.

(10) Patent No.: US 6,753,370 B2
(45) Date of Patent: *Jun. 22, 2004

(54) RESIN COMPOSITION AND MULTILAYERED STRUCTURE

(75) Inventors: Shigeki Nakatsukasa, Kurashiki (JP); Hiroyuki Ohgi, Kurashiki (JP); Kazuyori Yoshimi, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/091,482

(22) Filed: Mar. 7, 2002

(65) Prior Publication Data

US 2002/0128391 A1 Sep. 12, 2002

Related U.S. Application Data

(63) Continuation of application No. 08/974,490, filed on Nov. 19, 1997.

(30) Foreign Application Priority Data

Nov. 19, 1996 (JP) .............................................. 8-307784
Mar. 7, 1997 (JP) .............................................. 9-052856

(51) Int. Cl.$^7$ ......................... B32B 28/08; B32B 27/28; C08L 23/04; C08L 29/04
(52) U.S. Cl. ....................... 524/400; 524/405; 524/416; 524/417; 524/280; 524/399; 525/56; 525/57; 525/60; 526/160; 526/943; 428/36.6; 428/35.4; 428/515; 428/516; 428/518; 428/520; 428/523
(58) Field of Search ................................ 524/400, 405, 524/416, 417, 280, 399; 525/56, 57, 60; 526/160, 943; 428/36.6, 36.7, 35.4, 515, 516, 518, 520, 523

(56) References Cited

U.S. PATENT DOCUMENTS

| | | | |
|---|---|---|---|
| 3,645,992 A | 2/1972 | Elston | 260/80.78 |
| 5,026,798 A | 6/1991 | Canich | 526/127 |
| 5,055,438 A | 10/1991 | Canich | 502/117 |
| 5,322,877 A * | 6/1994 | Moriyama et al. | 524/399 |
| 5,492,953 A * | 2/1996 | Itamura et al. | 524/239 |
| 5,741,870 A | 4/1998 | Ikeda et al. | 526/198 |
| 5,770,664 A | 6/1998 | Okumura et al. | 526/127 |
| 5,869,573 A | 2/1999 | Kuroda et al. | 525/66 |
| 5,972,447 A | 10/1999 | Hata et al. | 428/35.7 |
| 6,140,420 A | 10/2000 | Sehanobish et al. | 525/125 |
| 6,258,464 B1 * | 7/2001 | Negi et al. | 428/516 |
| 6,294,609 B1 * | 9/2001 | Bertin et al. | 525/57 |
| 6,388,007 B1 * | 5/2002 | Nakatsukasa et al. | 525/57 |

FOREIGN PATENT DOCUMENTS

| | | |
|---|---|---|
| EP | 483 736 | 10/1990 |
| EP | 401 666 | 12/1990 |
| EP | 0 560 369 | 9/1993 |
| EP | 0 682 072 A2 | 11/1995 |
| JP | 6-166157 | 6/1994 |
| JP | 7-102133 | 4/1995 |
| JP | 7-329262 | 12/1995 |

OTHER PUBLICATIONS

Al–Sammerrai, D. and N.K. Al–Nidawy. "Polyethylene: Synthesis, Properties and Uses." Handbook of Polymer Science and Technology vol. 2: Performance Properties of Plastics Elastomers. Ed. Nicholas Cheremisinoff. New York: Marcel Dekker, Inc. 1989.

Dow Polyethylene. Technical Information and Literature. Affinity Packaging Brochure. Dow Chemical Company. Nov. 29, 2000. http://www.dow.com/webapps/lit/litorder.asp?filepath+polyethylene/pdfs/reg/305–01953.pdf&pdf=true.

* cited by examiner

*Primary Examiner*—Mark F. Huff
*Assistant Examiner*—Barbara Gilliam
(74) *Attorney, Agent, or Firm*—Oblon, Spivak, McClelland, Maier & Neustadt, P.C.

(57) ABSTRACT

A resin composition comprises a copolymer (A) comprising ethylene as a major component produced with a single-site catalyst, and an ethylene-vinyl alcohol copolymer (B) having an ethylene content of 20-60 mol. % and a degree of hydrolysis of 95% or above, the resin composition satisfying the equation (1):

$$1/99 \leq \{\text{weight of } (A)\}/\{\text{weight of } (B)\} \leq <99/1 \quad (1)$$

A preferred resin composition comprises a copolymer (A) which has a density of 0.90-0.94 g/cm$^3$ and the resin composition further comprises a carboxylic acid-modified polyolefin (C) and satisfies the equations (2) and (3):

$$60/40 \leq \{\text{weight of } (A)\}/\{(\text{weight of } (B)\} \leq 99/1 \quad (2)$$

$$0.1/99.9 \leq X \leq 20/80 \quad (3)$$

wherein X={weight of (C)}/{total weight of (A) and (B)}.

Another preferred resin composition comprises a copolymer (A) which has a density of 0.85–0.90 g/cm$^3$, and which satisfies the equation (5):

$$1/99 \leq \{\text{weight of } (A)\}/\{\text{weight of } (B)\} \leq 40/60 \quad (5)$$

The resin composition has superior melt moldability, gas barrier properties, flexural fatigue resistance, and impact resistance. It can be used in the preparation of a multilayered structure to impart a good appearance, delamination resistance, transparency, impact resistance, and gas barrier properties to the structure.

28 Claims, No Drawings

RESIN COMPOSITION AND MULTILAYERED STRUCTURE

This application is a Continuation of application Ser. No. 08/974,490 Filed on Nov. 19, 1997, now allowed.

BACKGROUND OF THE INVENTION

1. Field of the Invention

The present invention relates to a resin composition having superior melt molding properties, gas barrier properties, flexural fatigue resistance, and impact resistance. The present invention also relates to a multilayered structure, particularly one which has good appearance, good delamination resistance, good transparency, good impact resistance, and good gas barrier properties.

2. Description of the Background

Ethylene-vinyl alcohol copolymer (occasionally referred to as EVOH hereinafter) finds general use because of its good melt molding properties and gas barrier properties. In particular, it is useful in the form of multilayered plastic packaging material after lamination with a thermoplastic resin, (especially a polyolefin resin), which possesses superior moisture resistance and mechanical properties. This packaging material finds applications in the manufacture of bags, bottles, cups, pouches, and the like in a variety of areas, including foods, cosmetics, medicines, chemicals, and toiletries, on account of its good oxygen barrier properties.

Production of multilayered plastic containers inevitably gives rise to regrinds (scraps), such as edges trimmed from extruded sheets and films, flashes pinched from blow-molded bottles, and scraps punched from molded cups. Recycling of these regrinds is necessary for cost and material savings. To this end, a method for utilizing regrinds has been proposed by incorporating such into layers of a thermoplastic resin such as a polyolefin as a major constituent (Examined Published Japanese Patent Application No. 59-29409) and a method for utilizing regrinds by interposing a layer of regrinds between a layer of thermoplastic such as a polyolefin and a layer of EVOH (Unexamined Published Japanese Patent Application No. 59-101338).

The recycling of regrinds in the above-mentioned manner presents several difficulties. That is, when a thermoplastic resin, especially a polyolefin resin, and EVOH are extruded together with regrinds, EVOH tends to deteriorate, giving rise to black scorches which adhere to the insides extruders and to gel-like substances (gum) which adhere to the die lips of extruders. Moreover, deterioration of EVOH is accompanied by heterogeneous phase separation, which gives rise to foreign matter and anomalous flow. This results in containers having a poor appearance, having an odor of decomposed resin, and having poor mechanical properties such as impact resistance These difficulties prevent normal extrusion operation or restrict operation times. In addition, the presence of regrinds causes a wavy pattern on the surface of molded articles or causes interlayer or intralayer delamination when a blend of polyolefin and EVOH is coextruded with EVOH or polyolefin.

One way to address this problem is to incorporate the blend of EVOH and polyolefin resin into a polar group-modified polyolefin (typified by carboxylic acid-modified polyolefin), as disclosed in Unexamined Published Japanese Patent Application Nos. 49-57086, 3-72539, 5-98084, 61-111346, and 8-27332.

On the other hand, EVOH has the disadvantage of having poor flexibility, flexural fatigue resistance, and impact resistance. Therefore, it is not necessarily suitable for flexible bags and pouches, which need good flexural fatigue resistance, and bottles and cups, which need good impact resistance.

One way to improve the impact resistance and flexural resistance of EVOH is to incorporate a soft polyolefin into EVOH. An example of a soft polyolefin is a low-density polyethylene having a density of 0.086–0.91 g/cm$^3$, which is produced by using a Ziegler catalyst. (See Unexamined Published Japanese Patent Application No. 62-153333.) Nevertheless, the object of improving impact resistance and flexural resistance has not been achieved satisfactorily A recent polyolefin, which is attracting attention, is produced with a single-site catalyst having uniform polymerization active sites. In comparison to conventional polyolefins, it has a narrower molecular weight distribution and composition distribution. Consequently, it has superior transparency, strength, adhesiveness, heat-sealability, impact resistance, leaching resistance, and blocking resistance. It is under extensive study for development.

The ethylene-α-olefin copolymer produced by using a single-site catalyst finds many uses in the form of laminate with EVOH. Applications of the laminate include packaging laminate film (Unexamined Published Japanese Patent Application No. 7-232418), coextrusion film (Unexamined Published Japanese Patent Application No. 7-314624), multilayered film for balloon forming (Unexamined Published Japanese Patent Application No. 7-284570), heat-shrinkable film (Unexamined Published Japanese Patent Application No. 7-309962), and retort packaging material (Unexamined Published Japanese Patent Application No. 7-266520). These patent publications, however, do not mention anything about compositions of EVOH and ethylene-α-olefin copolymer and the recycling of regrinds.

A laminate is disclosed in Unexamined Published Japanese Patent Application No. 7-102133, which is made of a layer of EVOH and a layer of a resin composition comprising an ethylene-α-olefin copolymer produced with a single-site catalyst and a carboxylic acid-modified polyolefin. This resin composition is designed so as to provide good adhesiveness for a variety of resins such as nylon, EVOH, polyester, and ethylene-vinyl acetate copolymer. This patent application does not mention anything about composition comprising an ethylene-α-olefin copolymer, a carboxylic acid-modified polyolefin, and EVOH, nor does it mention anything about laminate having a layer of regrinds.

A laminate is disclosed in Unexamined Published Japanese Patent Application No. 7-329262 which is made up of a layer of a composition comprising recovered polyethylene, produced with a conventional catalyst, and a carboxylic acid-modified polyolefin, a layer of ethylene-α-olefin copolymer produced with a single-site catalyst, and a layer of EVOH. The laminate is characterized by good adhesion between the first two layers. This patent application, however, does not mention anything about incorporating the ethylene-α-olefin copolymer produced with a single-site catalyst with EVOH and further with a carboxylic acid modified polyolefin.

A laminate is disclosed in Unexamined Published Japanese Patent Application No. 6-166157 which is made up of a layer of syndiotactic polypropylene produced with a single-site catalyst, a layer of EVOH, a layer of a carboxylic acid-modified polyolefin, and a layer of regrinds. This patent publication, however, does not mention anything about the composition used for the layer of regrinds. In addition, the laminate does not have a layer of an ethylene-α-olefin copolymer produced by using a single-site catalyst. A need continues to exist for a laminate of improved properties, which is prepared from regrinds.

SUMMARY OF THE INVENTION

Accordingly, one object of the present invention is to provide a resin formulation which contains regrinds, which possesses improved impact resistance, flexural fatigue resistance, delamination resistance and gas barrier properties.

Briefly, this object and other objects of the present invention as hereinafter will become more readily apparent can be attained by a resin composition which comprises a copolymer (A) comprising ethylene as a major component produced with a single-site catalyst, and an ethylene-vinyl alcohol copolymer (B) having an ethylene content of 20–60 mol. % and a degree of hydrolysis of 95% or above, said resin composition satisfying the following equation (1):

$$1/99 \leq \text{(weight of }(A))/\{\text{weight of }(B)\} \leq 99/1 \quad (1)$$

DESCRIPTION OF THE PREFERRED EMBODIMENTS

An ethylene-α-olefin copolymer produced with a single-site catalyst displays marked characteristics when used as a laminate with EVOH, as mentioned above. Production of laminates accompanies regrinds, and an effective use of regrinds is an important economical subject for material saving. Unfortunately, there is no known way of utilizing regrinds containing said copolymer and EVOH. In addition, nothing is known about differences between regrinds containing said copolymer and regrinds containing a conventional copolymer (produced by using Ziegler catalyst).

The present invention offers a resin composition which is suitable for regrinds, which is characterized by the specific resin, compatibilizing agent, compounding ratio, and dispersing mode of the resin composition. The resin composition has improved melt moldability and permits regrinds to be recycled effectively. The present invention also offers a multilayered structure (or molded article) which is superior in appearance, delamination resistance, transparency, impact resistance, and gas barrier properties.

In the present invention, the resin composition of the invention is prepared by incorporating EVOH into a copolymer comprising ethylene, which copolymer is the major component of the composition, in a specific ratio. The resulting EVOH-based resin composition has improved impact resistance, flexural fatigue resistance, and gas barrier properties.

The copolymer (A) (sometimes referred to as "ethylene copolymer (A)") is preferably an ethylene-α-olefin copolymer in which the α-olefin has 3–8 carbon atoms or which has a molecular weight distribution (Mw/Mn) of not greater than 4.

In one embodiment, the ethylene-vinyl alcohol copolymer (B) is preferably one which contains a phosphorus compound in an amount of 2–200 ppm in terms of elemental phosphorus.

The resin composition is preferably one in which the copolymer (A) has a density of 0.90–0.94 g/cm³ and which further comprises a carboxylic acid-modified polyolefin (C) and satisfies the equations (2) and (3):

$$60/40 \leq \{\text{weight of }(A)\}/\{\text{weight of }(B)\} \leq 99/1 \quad (2)$$

$$0.1/99.9 \leq X \leq 20/80 \quad (3)$$

wherein X={weight of (C)}/{total weight of (A) and (B)}.

The resin composition is preferably one in which the resin particles of the ethylene-vinyl alcohol copolymer (B) and the carboxylic acid-modified polyethylene (C) are dispersed in a matrix of the copolymer (A), and have an average particle diameter not greater than 5 μm.

The resin composition is preferably one in which the melt flow rate Ma of the copolymer (A) and the melt flow rate Mb of the ethylene-vinyl alcohol copolymer (B) satisfy the equation (4):

$$0.05 \leq Ma/Mb \leq 5 \quad (4)$$

The resin composition is preferably one which further comprises a hydrotalcite compound (D) in an amount of 0.0001–2% based on the total weight of (A) and (B) and/or a metal salt of higher aliphatic carboxylic acid (E) in an amount of 0.0001–2% based on the total weight of (A) and (B).

An aspect of the present invention is to provide a multi-layered structure which comprises a layer of the resin composition defined above and a layer of an ethylene-vinyl alcohol copolymer having an ethylene content of 20–60 mol. % ethylene and a degree of hydrolysis of 95% or above.

The multilayered structure is preferably one which further comprises at least one layer comprising an ethylene-α-olefin copolymer produced by using a single-site catalyst and having a density of 0.90–0.94 g/cm³, in which the α-olefin has 3–8 carbon atoms and a carboxylic acid-modified polyolefin.

The multilayered structure is preferably formed by coextrusion.

In another embodiment, the resin composition is preferably one in which the copolymer (A) has a density of 0.85–0.90 g/cm³ and which satisfies the equation (5):

$$1/99 \leq \{\text{weight of }(A)\}/\{\text{weight of }(B)\} \leq 40/60 \quad (5)$$

The resin composition is preferably one in which the melt flow rate Ma of the copolymer (A) and the melt flow rate Mb of the ethylene-vinyl alcohol copolymer (B) satisfy the following equation (6):

$$0.2 \leq Ma/Mb \leq 20 \quad (6)$$

The resin composition is preferably one which further comprises a carboxylic acid-modified polyolefin (C) and satisfies the equation (7):

$$0.1/99.9 \leq X \leq 20/80 \quad (7)$$

where X={weight of (C)}/{total weight of (A) and (B)}

In a preferred embodiment, the multilayered structure comprises a layer of the resin composition defined above, a layer of adhesive resin, and a layer of polyolefin. Further, a bag-in-box container comprises the multilayered structure defined above, in which a core layer of the resin composition is laminated with inner and outer layers of an ethylene-α-olefin copolymer via layers of adhesive resin.

In the present invention, copolymer (A) is one produced with a single-site catalyst. The copolymer comprising ethylene as a major component as referred to throughout the specification and appended claims is one having an ethylene content of 50 wt. % or more.

The comonomer to be copolymerized with ethylene is not particularly limited. Suitable examples of the comonomer include an α-olefin such as propylene, 1-butene, 1-hexene, 1-octene, or 4-methyl-1-pentene; a vinyl compound such as styrene, diolefins, N-vinylcarbazole, vinyl chloride, vinylidene chloride, vinyl acetate, acrylonitrile, or vinyl ether; an unsaturated carboxylic acid such as maleic acid, acrylic acid, methacrylic acid, methacrylic acid, fumaric acid, or itaconic acid, or esters or anhydrides thereof, with or without a hydroxyl group or an epoxy group added thereto, and the like. Preferred examples of the comonomer to be copolymerized with ethylene include $C_{3-8}$ α-olefins such as propylene, 1-butene, isobutene, 1-pentene, 1-hexene, 1-heptene, 1-octene, 3-methyl-1-butene, 4-methyl-1-pentene, and 4,4-dimethyl-1-pentene. They may be use alone or in combination with one another. Of these examples, 1-butene, isobutene, 1-pentene, 1-hexene, 1-octene, and 4-methyl-1-pentene are desirable because of their low price and their flexibility in controlling the copolymer make-up.

Comonomers having 9 or more carbon atoms are not desirable because of their high price and low reactivity (leading to difficulties in their introduction into the copolymer).

In the present invention, the single-site catalyst is a catalyst which is characterized by having uniform active sites. Typical examples include metallocene catalysts. In actual olefin polymerization, the metallocene compound is preferably used in combination with an organoaluminum compound (typified by aluminoxane) or a compound with which it reacts to form a stable anion.

The metallocene transition metal compound employed in the present invention is a compound in which at least one ligand having the cyclopentadienyl skeleton is attached ($\eta^5$) to a metal belonging to Groups 3–10 or a lanthanum series element of the Periodic Table. Suitable examples of the metal include titanium, zirconium, hafnium, vanadium, niobium, tantalum, chromium, lanthanum, nickel, palladium, rhodium, and iridium. Preferred among these metals are titanium, zirconium, hafnium, vanadium, nickel, and palladium.

Examples of the cyclopentadienyl group or substituted cyclopentadienyl group ligands include the cyclopentadienyl group, alkyl-substituted cyclopentadienyl, indenyl, alkyl-substituted indenyl, 1,5,6,7-tetrahydroindenyl, alkyl-substituted 1,5,6,7-tetrahydroindenyl, fluorenyl, and alkyl substituted fluorenyl. In these groups the substituent alkyl group may be substituted with halogen atoms or trialkylsilyl groups. Of these ligands, the cyclopentadienyl group and the alkyl-substituted cyclopentadienyl group are particularly desirable. In case where one molecule of metallocene compound contains two or more cyclopentadienyl groups, those groups having them may be bonded to each other through an alkylene group such as ethylene, propylene, and isopropylidene or a substituted silylene group such as diphenylsilylene and methylphenylsilylene.

Suitable examples of the metallocene compounds include cyclopentadienyltitaniumtris(dimethylamide), methylcyclopentadiethyltitaniumtris(dimethylamide), bis(cyclopentadienyl)titanium dichloride, dimethylsilyltetramethylcyclopentadienyl-t-butylamidezirconium dichloride, dimethylsilyltetramethylcyclopentadienyl-t-butylamidehafnium dichloride, dimethylsilyltetramethylcyclopentadienyl-p-n-butylphenylamidezirconium dichloride, methylphenylsilyltetramethylcyclopentatdienyl-t-butylamidehafnium dichloride, (t-butylamide)(tetramethylcyclopentadienyl)-1,2-ethanediyltitanium dichloride, indenyltitaniumtris(dimethylamide), indenyltitaniumtris(diethylamide), indenyltitaniumbis(di-n-butylamide), and indenyltitaniumbis(di-n-propylamide).

Another type of single-site catalyst is a metal-diimine complex compound, examples of which are as follows:

N,N'-bis(diisopropylphenyl)diimine nickel dibromide,
N,N'-bis(diisopropylphenyl)diimine nickel dichloride,
N,N'-bis(diisopropylphenyl)diimine nickel dimethyl,
N,N'-bis(diisopropylphenyl)diimine palladium dibromide,
N,N'-bis(diisopropylphenyl)diimine palladium dichloride,
N,N'-bis(diisopropylphenyl)diimine palladium dimethyl,
N,N'-bis(dimethylphenyl)diimine nickel dibromide,
N,N'-bis(dimethylphenyl)diimine nickel dichloride,
N,N'-bis(dimethylphenyl)diimine nickel dimethyl,
N,N'-bis(dimethylphenyl)diimine palladium dibromide,
N,N'-bis(dimethylphenyl)diimine palladium dichloride, and
N,N'-bis(dimethylphenyl)diimine palladium dimethyl.

These single-site catalysts are used in combination with an activating cocatalyst, which is an aluminum compound having an Al—O bond such as a linear or cyclic aluminoxane. The aluminoxane is formed when alkylaluminum comes into contact with water. In other words, it is obtained when alkylaluminum is added to the system at the time of polymerization and water is added to the system afterwards, or if alkylaluminum is reacted with water of crystallization in the complex or absorbed water in inorganic compounds. Suitable examples of the alkyl-aluminum include triethylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

Examples of the component which reacts with the metallocene compound to form a stable anion include an organoboron compound anion, an organoaluminum compound anion, an organogallium compound anion, an organophosphorus compound anion, an organosilicon compound anion, an organoarsenic compound anion, and an organoantimony compound anion.

There are no specific limitations on the conditions of polymerization using the single-site catalyst. It is possible to carry out polymerization batchwise or continuously in the same manner as in a polymerization with a Ziegler catalyst, such as bulk polymerization, solution polymerization, suspension polymerization, or gas-phase polymerization. High-pressure ion polymerization at 1–100 atms, preferably 1–50 atms, and at 0–250° C., preferably 25–200° C., is preferred.

The copolymer (A) produced with a single-site catalyst has a melt flow rate (MFR) of 0.1–50 g/min, preferably 0.5–30 g/min (measured at 210° C. under a load of 2,160 g), although it is not specifically limited in MFR.

The objective of the present invention is achieved with the present copolymer comprising ethylene as a major component produced which is produced with a single-site catalyst. If this copolymer is replaced by a conventional copolymer prepared with a Ziegler catalyst, the resulting composition does not have satisfactory transparency, adhesiveness, impact resistance, and flexural fatigue resistance, as shown in Comparative Examples infra. The reason for this is not fully understood. It is presumed that in the interface between the copolymer comprising ethylene as a major component and EVOH, the interfacial adhesive force is high, or its interfacial tension in the molten state is low. These interfacial effects contribute to good transparency, interlayer adhesion, impact resistance, and flexural fatigue resistance. These effects are enhanced when a carboxylic acid-modified polyolefin is used as the compatibilizing agent.

According to the present invention, copolymer (A) preferably has a molecular weight distribution (Mw/Mn) of not greater than 4. Meeting this requirement leads to good transparency, interlayer adhesiveness, impact resistance, and flexural fatigue resistance.

EVOH (B) is an ethylene-vinyl alcohol copolymer having an ethylene content of 20–60 mol. %, preferably 25–55 mol. %, most desirably 30–50 mol. %, and which has a degree of hydrolysis (of the vinyl ester moiety) of 95% or above, preferably 98% or above, most desirably 99% or above. In addition, EVOH (B) is not specifically limited in melting point; however, it preferably has a melting point in the range of 125–220° C., preferably 135–200° C. If the ethylene content less than as specified above and if the melting point is higher than as specified above, the copolymer has poor melt moldability. If the ethylene content is higher than as specified above, the copolymer has poor gas barrier properties. If the degree of hydrolysis is lower than as specified above, the copolymer has poor gas barrier properties and thermal stability and causes gels and hard spots.

It is possible to determine the ethylene content and the degree of hydrolysis by NMR (nuclear magnetic resonance) and to determine the melting point by DSC (differential scanning calorimetry) at a scanning speed of 10° C./min.

The EVOH used in the present invention preferably has a melt flow rate (MFR) of 0.1–100 g/10 min, preferably 0.5–50 g/10 min, measured at 210° C. under a load of 2,160 g. according to JIS K7210.

The EVOH is produced using vinyl acetate as a typical vinyl ester. It is also possible to use other fatty acid vinyl esters such as vinyl propionate and vinyl pivalate.

EVOH (B) may contain a vinylsilane compound, as a comonomer, in an amount of 0.0002–0.2 mol. %. EVOH (B) containing this comonomer has improved melt viscosity, which contributes not only to dispersibility at the time of blending, but also to homogeneous coextrusion in the production of multilayered films. Examples of the vinylsilane compound include vinyltrimethoxysilane, vinyltriethoxysilane, vinyltri(β-methoxyethoxy)silane, and γ-methacryloxypropylmethoxysilane. With vinyltrimethoxysilane and vinyltriethoxysilane are particularly preferred.

EVOH (B) may also contain a boron compound. EVOH (B) containing a boron compound has improved melt viscosity, which contributes not only to dispersibility at the time of blending, but also to homogeneous coextrusion in the production of multilayered films. Suitable examples of the boron compound include boric acids, boric acid esters, boric acid salts, and hydrogenated borons. Boric acids include orthoboric acid, metaboric acid, and tetraboric acid. Boric acid esters include triethyl borate and trimethyl borate. Boric acid salts include alkali metal salts and alkaline earth metal salts of the foregoing boric acids and borax. Of these examples, orthoboric acid (simply referred to as boric acid) and $NaBH_4$ are preferred.

The content of the boron compound is 20–2,000 ppm, preferably 50–1,000 ppm (in terms of boron), so that EVOH (B) gives an ethylene-vinyl alcohol copolymer which experiences a minimum of torque fluctuation at the time of heating and melting. A content less than 20 ppm is not enough to produce this effect, and a content higher than 2,000 ppm tends to cause gelation and poor molding.

EVOH may be copolymerized further with other comonomers such as propylene, butylene, unsaturated carboxylic acid e.g., (meth) acrylic acid, an ester of an unsaturated carboxylic acid, e. g., methyl (meth) acrylate and ethyl (meth) acrylate, and vinylpyrrolidone, e.g., N-vinylpyrrolidone, in an amount which does not impair the objectives of the present invention.

In the present invention, it is possible to use two or more kinds of EVOH in combination. In addition, it is also possible to incorporate EVOH with a heat stabilizer, UV light absorber, antioxidant, coloring agent, filler, and other resins such as polyamide and partly hydrolyzed ethylene-vinyl acetate copolymer in the composition. in amounts which do not impair the present invention.

According to the present invention, EVOH (B) preferably contains a phosphorus compound in an amount of 2–200 ppm, more preferably 3–150 ppm, most desirably 5–100 ppm, in terms of elemental phosphorus. A content of less than 2 ppm or higher than 200 ppm will pose a problem with thermal stability and film forming performance, thereby resulting in gel like hard spots and discoloration after prolonged operation.

There are no specific limitations on the type of phosphorus compound added to EVOH (B). It is possible to use phosphoric acid, phosphorous acid, or salts thereof. Phosphates may be monobasic phosphate, dibasic phosphate, or tribasic phosphate, and their cations are not specifically limited. Alkali metal salts and alkaline earth metal salts are preferred. It is desirable to add the phosphorus compound to the composition in the form of sodium dihydrogenphosphate, potassium dihydrogenphosphate, disodium hydrogenphosphate, or dipotassium hydrogenphosphate.

According to the present invention, EVOH (B) preferably contains an alkali metal salt in an amount of 5–5000 ppm in terms of elemental alkali metal. This alkali metal salt prevents anomalous flow such as scorching and gum, thereby contributing to scrap recovery and to improvement in impact resistance and flexural fatigue resistance.

The content of the alkali metal salt more preferably ranges from 20–1000 ppm, most preferably 30–500 ppm, in terms of elemental alkali metal. Examples of the alkali metal include lithium, sodium, and potassium. Examples of the alkali metal salt include monovalent metal salts of aliphatic carboxylic acids, aromatic carboxylic acids, and phosphoric acid, and metal complexes. The salts include sodium acetate, potassium acetate, sodium phosphate, lithium phosphate, sodium stearate, potassium stearate, and sodium ethylenediaminetetraacetae. Of these, sodium acetate, potassium acetate and sodium phosphate are particularly preferred.

According to the present invention, the resin composition contains the ethylene-α-olefin copolymer (A) and EVOH (B) in amounts such that their ratio (A)/(B) ranges from 1/99–99/1 by weight. At these blending ratios, the resin composition exhibits the performance intended in the present invention.

The present resin composition is preferably one of two make-ups. In the first preferred embodiment, the resin composition comprises an ethylene copolymer (A) having a density of 0.90–0.94 g/cm³, EVOH (B), and a carboxylic acid-modified polyolefin (C) and satisfies equations (2) and (3):

$$60/40 \leq \{\text{weight of } (A)\}/\{\text{weight of } (B)\} \leq 99/1 \quad (2)$$

$$0.1/99.9 \leq X \leq 20/80 \quad (3)$$

wherein X={weight of (C)}/{total weight of (A) and (B)}. This resin composition is referred to as resin composition (1) hereinafter.

Resin composition (1) has improved melt molding properties, permits effective recycling of regrinds, and provides molded articles, especially multilayered structures, superior in appearance, delamination resistance, transparency, impact resistance, and gas barrier properties. Therefore, it is particularly preferred.

Resin composition (1) comprises ethylene copolymer (A) and EVOH (B) such that their ratio (A)/(B) by weight ranges from 60/40–99/1, preferably from 70/30–98/2. At a ratio higher than 99/1, the resin composition has poor gas barrier properties, although it exhibits comparatively good moldability even though the carboxylic acid-modified polyolefin (C) is not added. By contrast, at a ratio less than 60/40, the resin the composition tends to contain particles of ethylene copolymer (A) and carboxylic acid modified polyolefin (C) dispersed in EVOH (B). This aggravates interlayer adhesion.

The ethylene copolymer (A) component of resin composition (1) is a copolymer comprising ethylene, as a major component, which is produced from a single-site catalyst and has a density of 0.90–0.94 g/cm³.

Ethylene copolymer (A) is preferably a copolymer of ethylene with a $C_{3-8}$ α-olefin. The copolymer is preferably produced by polymerization of ethylene over a single-site catalyst in an amount of 80–99 wt. %, preferably 85–98 wt. %, more preferably 90–97 wt. %, and one or more α-olefins in an amount of 1–20 wt. %, preferably 2–15 wt. %, more preferably 3–10 wt. %.

Ethylene copolymer (A) component of resin composition (1) has a density of 0.90–0.94 g/cm³, preferably 0.905–0.935 g/cm³, more preferably 0.91–0.935 g/cm³. At a density higher than 0.94 g/cm³, the ethylene copolymer (A) adversely affects interlayer adhesion and transparency. At a density less than 0.90 g/cm³, copolymer (A) does not provide the elastic modulus necessary for containers to exhibit stiffness for ordinary use.

The carboxylic acid-modified polyolefin (C) used in resin composition (1) is a polyolefin having carboxyl groups in its molecule. Component (C), for example, is formed by grafting an unsaturated dicarboxylic acid anhydride on a polyolefin or is formed by copolymerizing an olefin monomer and an unsaturated carboxylic acid. When added to the ethylene copolymer (A) and EVOH (B), the carboxylic acid-modified polyolefin contributes to the compatibility, adhesion strength, and transparency of the composition.

The carboxylic acid-modified polyolefin (C) may contain, as its olefin moiety, ethylene, propylene, 1-butene, 2-butene, or styrene. The olefin monomer may be copolymerized with a monomer such as vinyl acetate or (meth)acrylate ester. Of these examples, carboxylic acid-modified polyethylene is preferred because of its ability to impart good transparency and compatibility to the resin composition.

The unsaturated dicarboxylic acid anhydride used for grafting includes, for example, maleic anhydride, itaconic anhydride, and citraconic anhydride, with maleic anhydride being preferred. The unsaturated carboxylic acid for copolymerization with olefin monomer includes acrylic acid or methacrylic acid.

The carboxylic acid-modified polyolefin (C) has a melt flow rate (MFR) of 0.1–100 g/10 min, preferably 0.5–50 g/10 min, measured at 190° C. under a load of 2,160 g.

Resin composition (1) comprises ethylene copolymer (A), EVOH (B), and carboxylic acid-modified polyolefin (C) such that the ratio (by weight) of (C)/(A)+(B)) is 0.1/99.9–20/80, preferably 0.5/99.5–18/82, more preferably 1/99–15/85. At a ratio less than 0.1/99.9, the resin composition does not exhibit the performance intended in the present invention. At a ratio higher than 20/80, the resin composition has poor thermal stability (leading to gels and hard spots).

The ethylene copolymer (A) and EVOH (B) in resin composition (1) have melt flow rates Ma and Mb, respectively, such that the ratio Ma/Mb satisfies the equation (4):

$$0.05 \leq Ma/Mb \leq 5 \quad (4)$$

The requirement is necessary for good dispersibility, melt stability, delamination resistance, and transparency.

There are no specific limitations on the method of blending the ethylene copolymer (A), EVOH (B), and carboxylic acid-modified polyolefin (C). A dry blend of these components may be employed as such or preferably after pelletizing by extrusion through a Banbury mixer and single- or twin-screw extruder, followed by drying. This extrusion is preferably carried out at a low temperature using a high-performance extruder, with its hopper sealed with nitrogen, so as to ensure uniform blending, which is necessary to avoid gels and hard spots which leads to cracking.

A preferred way to achieve better performance is to previously mix (by melting) the ethylene copolymer (A) and/or EVOH (B) with the carboxylic acid-modified polyolefin (C) and then to mix this mixture with the ethylene copolymer (A) and/or EVOH (B) and finally mold the resulting blend. Molded articles thus obtained have a good appearance and permit effective recycling of regrinds.

The reason for the improved moldability is not fully elucidated. It is presumed that the mixing of (A) and/or (B) with (C) results in a mixture having its particular characteristics because of intimate mixing at the molecular level, which enhances the compatibility between (A) and (B). The consequence is uniform dispersion of the three components and improvement in quality and moldability.

The thus obtained resin composition (1) contains the resin components dispersed therein such that particles of (B) and (C) are dispersed in the matrix of (A). Dispersion in this way helps the resin composition to have good transparency and interlayer adhesion.

Particles of (B) and (C) dispersed in (A) in resin composition (1) preferably have an average particle diameter not greater than 5 μm, more preferably not greater than 4 μm, and most desirably not greater than 3 μm. Particles with an average particle diameter larger than 5 μm aggravate the interlayer adhesion and transparency and hence deteriorate the effect of the present invention. Incidentally, the average particle diameter is an arithmetic mean of diameters of particles appearing on an arbitrary cross-section.

According to the present invention, resin composition (1) preferably comprises a hydrotalcite compound (D) in an amount of 0.0001–2%, more preferably 0.0001–1%, based on the total weight of (A) and (B), in order to prevent the occurrence of gels and fisheyes in the layer of the resin composition, thereby ensuring stable operation for a long time.

The hydrotalcite compound is particularly a double salt of the formula: $M_xAl_y(OH)_{2x+3y-2z}(A)_z \cdot aH_2O$, wherein M denotes Mg, Ca, or Zn; A denotes $CO_3$ or $HPO_4$; and x, y, z, and a each denotes a positive number. Preferred examples of the hydrotalcite compound are listed below.

$Mg_6Al_2(OH)_{16}CO_3 \cdot 4H_2O$
$Mg_8Al_{20}(OH)_{20}CO_3 \cdot 5H_2O$
$Mg_5Al_2(OH)_{14}CO_3 \cdot 4H_2O$
$Mg_{10}Al_2(OH)_{22}(CO_3)_2 \cdot 4H_2O$
$Mg_6Al_2(OH)_{16}HPO_4 \cdot 4H_2O$
$Ca_6Al_2(OH)_{16}CO_3 \cdot 4H_2O$
$Zn_6Al_6(OH)_{16}CO_3 \cdot 4H_2O$
$Mg_{4.5}Al_2(OH)_{13}CO_3 \cdot 3.5H_2O$ Another example of the hydrotalcite compound is a hydrotalcite solid solution disclosed in Unexamined Published Japanese Patent Application No. 1-308439 (U.S. Pat. No. 4,954,557). It has the formula:

$[Mg_{0.75}Zn_{0.25}]_{0.67}Al_{0.33}(OH)_2(CO_3)_{0.167} \cdot 0.45H_2O$.

According to the present invention, resin composition (1) preferably further comprises a metal salt of higher aliphatic carboxylic acid (E) in an amount of 0.0001–2%, preferably 0.001–1%, based on the total weight of (A) and (B), so as to prevent the occurrence of gels and fisheyes in the layer of the resin composition, thereby ensuring stable operation for a long time.

The metal salt of a higher aliphatic carboxylic acid means a metal salt of a $C_{8-22}$ higher fatty acid. Examples of the $C_{8-22}$ higher fatty acid include lauric acid, stearic acid, and myristic acid. Examples of the metal include sodium, potassium, magnesium, calcium, zinc, barium, and aluminum. Of these metals, alkaline earth metals such as magnesium, calcium, and barium are preferred.

In a preferred embodiment of the present invention, resin composition (1) contains both (D) and (E).

It is recommended to dilute (D) and (E) 2–100 times with an ethylene-α-olefin copolymer which is produced with a single-site catalyst before blending with (A), (B), and (C). This procedure improves their dispersion.

Resin composition (1) may contain one or more kinds of hindered phenol or amine heat stabilizer in an amount of 0.01–1 wt. % of the total weight of (A) and (B), in order to enhance the effect of the present invention. The resin composition may contain other additives such as plasticizers, heat stabilizers, UV light absorbers, antioxidants, coloring agents, and fillers, examples of which are listed as follows:

Antioxidants: 2,5-di-t-butylhydroquinone, 2,6-di-t-butyl-p-cresol. 4,4'-thiobis(6-t-butylphenol), 2,2'-methylenebis-(4-methyl-6-t-butylphenol), octadecyl-3-(3',5'-di-t-butyl-4'-hydroxyphenyl)propionate, and 4,4'-thiobis-(6-t-butylphenol).

UV light absorbers: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, and 2,2'-dihydroxy-4-methoxybenzophenone.

Plasticizers: dimethyl phthalate, diethyl phthalate, dioctyl phthalate, wax, liquid paraffin, and phosphoric acid ester.

Antistatic agents: pentaerithrytol monostearate, sorbitan monopalmitate, sulfated polyolefin, polyethylene oxide, and carbowax.

Slip agents: ethylene bis-stearamide and butyl stearate.

Coloring agents: carbon black, phthalocyanine, quionacridone, indoline, azoic pigment, and red iron oxide.

Fillers: glass fiber, asbestos, wollastonite, and calcium silicate.

Resin composition (1) may incorporate other polymeric compounds to an extent that the effect of the present invention is not impaired.

According to the present invention, it is possible to prepare a multilayered structure superior in appearance and gas barrier properties by laminating a layer of the resin composition (1) and a layer of EVOH having an ethylene content of 20–60 mol. % and a degree of hydrolysis of 95% or above. Lamination is preferably carried out by coextrusion.

It is important that the EVOH used for the multilayered structure has an ethylene content of 20–60 mol. %, preferably 25–55 mol. %, and more preferably 30–50 mol. %. At an ethylene content lower than 20 mol. %, the EVOH has poor melt-moldability. At an ethylene content higher than 60 mol. %, the EVOH has poor gas barrier properties. It is also important that the EVOH has a degree of hydrolysis of 95% or above, preferably 99% or above. EVOH with a degree of hydrolysis less than 95% has poor gas barrier properties.

The multilayered structure containing the layer of resin composition (1) may be laminated with inner and/or outer layers of thermoplastic resin for protection of the EVOH layer.

The EVOH layer for the gas barrier layer is not specifically limited in thickness. It is usually 5–100 μm thick, preferably 10–50 μm thick. The layer of the resin composition (1) is usually 10–2,000 μm thick, preferably 20–1,000 μm thick. The inner and outer layers of thermoplastic resin impart moisture resistance, heat resistance, heat-sealability, and mechanical characteristics to the multilayered structure. They also protect the EVOH layer from moisture which deteriorates its gas barrier properties.

The thermoplastic resin is not specifically limited. The resins include, for example, ethylene-α-olefin copolymers (mentioned above), polyethylene, ethylene-vinyl acetate copolymer, ethylene-acrylic acid copolymer, ethylenemethacrylic acid copolymer, ethylene-acrylic ester copolymer, polypropylene, polystyrene resin, polyamide resins, polyester resins, polycarbonate resins, polyurethane resins, and polyvinyl chloride resins. Preferred among these examples are ethylene-α-olefin copolymer, low-density polyethylene, high-density polyethylene, and polypropylene. The most desired resin is ethylene-α-olefin copolymer produced with a single-site catalyst. These resin layers may contain the above-mentioned additives, such as antioxidant, coloring agent, and filler.

The multilayered structure of the present invention may contain an interlayer adhesive resin (AD for short hereinafter). The adhesive resin is not specifically limited as long as it is capable of bonding layers to each other. Adhesive resins include, for example, olefin polymers such as polypropylene and polyethylene, or copolymers of ethylene and a monomer copolymerizable therewith such as vinyl acetate and acrylic ester, such as ethylene-vinyl acetate copolymer, ethylene-methyl (or ethyl) (meth)acrylate copolymer, graft-modified with an unsaturated carboxylic acid and anhydride thereof such as maleic anhydride by grafting. A preferred resin is the carboxylic acid-modified polyolefin (C) present in the resin composition.

The multilayered structure may be produced by extrusion lamination, dry lamination, coinjection molding, coextrusion molding, and solution coating. Coextrusion is preferred because of its easy and economical operation. Coextrusion is divided into coextrusion lamination, coextrusion sheet molding, coextrusion inflation, and coextrusion blow molding.

The thus obtained multilayered structure in the form of sheet, film, or parison, may be reheated and molded into a desired article. Reheating is performed at a temperature not higher than the melting point of the EVOH. Molding is accomplished by drawing (thermoforming) or uniaxial or biaxial stretching such as roll stretching, pantograph stretching, inflation stretching, or blow molding.

The multilayered structure is preferably formed by coextrusion of the resin composition (1) (prepared from components (A), (B), and (C) as mentioned above) and EVOH, so that it has a good appearance and facilitates the recovery of regrinds.

The multilayered structure may be irradiated with radiation or electron beams so as to crosslink the layers of EVOH and thermoplastic resin. Alternatively, a chemical crosslinking agent may be incorporated in the raw materials at the time of extrusion.

The layers constituting the multilayered structure may have any thickness whose ratio is not specifically limited. The thickness of the EVOH layer is preferably about 0.5–20%, particularly 1–10%, of the total thickness. The multilayered structure is not specifically limited in construction. Typical layer constructions are shown below, in which PO stands for polyolefin as the thermoplastic resin, AD stands for the adhesive resin and RC(1) stands for resin composition (1).

EVOH/AD/RC(1)
EVOH/AD/RC(1)/PO
EVOH/AD/RC(1)/AD/PO
PO/AD/EVOH/AD/RC(1)/PO
RC(1)/AD/EVOH/AD/RC(1)/PO
RC(1)/AD/EVOH/AD/PO

When the multilayered structure has two or more PO layers, the PO layers may be formed from identical or different PO.

According to the present invention, the raw material of resin composition (1) may contain regrinds recovered from said multilayered structure and also scraps recovered from other polyolefin molded articles.

Containing EVOH which has superior gas barrier properties, the above-mentioned multilayered construction is useful as a packaging material for foods, medicines, and medial supplies and industrial material, which need transparency and gas barrier properties.

It is of great industrial significance that resin composition (1) of the present invention permits the recovery and recycling of regrinds from the multilayered structure having polyolefin and EVOH layers and also from the containers made from the multilayered structure.

Another preferred resin composition of the present invention is as follows. The resin composition comprises a copolymer (A) comprising ethylene as a major component and having a density of 0.85–0.90 g/cm$^3$, and EVOH (B), which satisfies the equation (5):

$$1/99 \leq \{\text{weight of }(A)\}/\{\text{weight of }(B)\} \leq 40/60 \quad (5)$$

The composition is referred to as resin composition (2) hereinafter.

Resin composition (2) not only has superior gas barrier properties because of EVOH as the major component, but also superior impact resistance and flexural fatigue resistance.

Resin composition (2) comprises copolymer (A) and EVOH (B) in such amounts that their weight ratio (A)/(B) is from 1/99–40/60, preferably from 2/98–30/70. At a ratio higher than 40/60, resin composition (2) has poor gas barrier properties. At a ratio less than 1/99, resin composition (2) has poor impact resistance and flexural fatigue resistance.

The ethylene copolymer (A) used in resin composition (2) is a copolymer comprising ethylene, as a major component, which is produced with a single-site catalyst. The copolymer has a density of 0.85–0.90 g/cm$^3$.

Ethylene copolymer (A) is preferably a copolymer of ethylene with a $C_{3-8}$-α-olefin. It is preferably produced in the presence of a single-site catalyst from ethylene in an amount of 92–50 wt. %, preferably 90–55 wt. %, more preferably 85–55 wt. %, and one or more α-olefins in an amount of 8–50 wt. %, preferably 10–45 wt. %, more preferably 15–45 wt. %.

Ethylene copolymer (A) in resin composition (2) has a density of 0.85–0.90 g/cm$^3$, preferably 0.855–0.895 g/cm$^3$, more preferably 0.86–0.89 g/cm$^3$. At a density higher than 0.90 g/cm$^3$, ethylene copolymer (A) adversely affects impact strength and flexural fatigue resistance. At a density less than 0.85 g/cm$^3$, copolymer (A) has extremely low crystallinity, which presents difficulties in handling due to chip sticking.

The ethylene copolymer (A) and EVOH (B) in resin composition (2) should have melt f low rates Ma and Mb, respectively, such that the ratio Ma/Mb satisfies the equation (6):

$$0.2 \leq Ma/Mb \leq 20 \quad (6)$$

The requirement is necessary for good dispersibility, impact resistance, flexural fatigue resistance, and gas barrier properties.

Resin composition (2) may contain, in addition to ethylene copolymer (A) and EVOH (B), a carboxylic acid-modified polyolefin (C) so that it exhibits good dispersibility, impact resistance, flexural fatigue resistance, and gas barrier properties. The component (C) is identical with that explained above in connection with the resin composition (1).

Resin composition (2) preferably comprises ethylene copolymer (A), EVOH (B), and carboxylic acid modified polyolefin (C) such that the ratio (by weight) of (C)/{(A)+(B)} is 0.1/99.9–20/80, preferably 0.5/99.5–15/85, more preferably 1/99–10/90. At a ratio lower than 0.1/99.9, resin composition does not exhibit the performance intended in the present invention. At a ratio higher than 20/80, the resin composition has poor thermal stability (leading to gels and hard spots).

There are no specific limitations on the method of blending the ethylene copolymer (A), EVOH (B), and modified polyolefin (C). These methods explained above in connection with the resin composition (1) can be used.

The thus obtained resin composition (2) contains the resin components such that particles of the ethylene copolymer (A) are dispersed in the matrix of EVOH (B). Dispersion in this way contributes to good gas barrier properties.

Resin composition (2) contains the ethylene copolymer (A) and EVOH (B) in a way that particles of (A) dispersed in (B) have an average particle diameter not greater than 5 μm, preferably not greater than 4 μm, and most desirably not greater than 3 μm. Particles larger than 5 μm aggravate impact resistance and flexural fatigue resistance and hence deteriorate the effect of the present invention.

Resin composition (2) may be blended with several additives and polymeric compounds, as in the case of resin composition (1), in order to improve the melt stability of the composition and to enhance the effect of the present invention. These additives include hydrotalcite compounds, hindered phenol or amine heat stabilizers, and metal salts of higher fatty carboxylic acid such as calcium stearate and magnesium stearate, which have been explained above in connection with resin composition (1).

The multilayered structure containing the layer of resin composition (2) may be laminated with inner and/or outer layers of thermoplastic resin for protection of the EVOH layer. The thermoplastic resin for this purpose is not specifically limited. The same resin as explained above in connection with resin composition (1) may be used.

The multilayered structure may contain an interlayer adhesive resin, if necessary. The same adhesive resinsone as explained above in connection with the resin composition (1) may be used.

The multilayered structure, which contains the layer of resin composition (2), is not specifically limited in layer construction. It preferably has a polyolefin (PO) layer of thermoplastic resin and an adhesive resin (AD) layer of carboxylic acid-modified polyolefin. The polyolefin layer contributes to mechanical properties and moisture resistance. Typical examples of layer construction are PO/AD/RC(2) and PO/AD/RC(2)/AD/PO {where RC(2) stands for resin composition(2)}. The layer construction having outer polyolefin layers is desirable because these layers isolate the layer of the resin composition from moisture. The polyolefin layer may be formed from a polyolefin containing regrinds of EVOH and adhesive resin.

The multilayered structure having a layer of resin composition (2) may be produced in any manner without specific restrictions. It is possible to adopt the abovementioned method used to produce the multilayered structure having a layer of resin composition (1).

The multilayered structure having a layer of resin composition (2) has superior gas barrier properties, impact resistance, and flexural fatigue resistance. Therefore, it is useful as a packaging material for foods, medicines, and medial supplies and industrial material, which need these characteristic properties.

Resin composition (2) produces its marked effect when used as a bag-in-box container which imperatively need flexibility, especially flexural fatigue resistance. According to a preferred embodiment, the bag-in-box container is made of a laminate having a core layer of resin composition(2) and inner and outer layers of ethylene-α-olefin copolymer via a layer of adhesive resin. The ethylene-α-olefin copolymer constituting the inner and outer layers is preferably one which has a density of 0.90–0.94 $g/cm^3$. It may also be one which is produced by a single-site catalyst or a conventional Ziegler catalyst.

It is of great industrial significance that resin composition (2) of the present invention provides an EVOH composition having superior impact resistance, flexural fatigue resistance, and gas barrier properties. A multilayered structure having a layer formed from resin composition (2) and a high-performance container made from the structure are provided.

Having generally described this invention, a further understanding can be obtained by reference to certain specific examples which are provided herein for purposes of illustration only and are not intended to be limiting unless otherwise specified.

The examples are divided into two groups, one relating to cups thermoformed from a multilayered sheet and the other relating to flexible packaging containers formed from a multilayered film.

Samples were tested by the following methods.

Appearance of Multilayered Sheet:

Samples of multilayered sheet were tested for appearance by visual inspection 30 minutes and 6 hours after the start of operation. Appearance is rated in four grades as follows:

A . . . no defects in appearance

B . . . slightly noticeable gels, fisheyes, or streaks

C . . . moderately noticeable gels, fisheyes, or streaks

D . . . apparently noticeable gels, fisheyes, or streaks

Particle Dispersion in Multilayered Sheet or Film:

A specimen cut out of the multilayered sheet or film is dipped in liquid nitrogen and is cut at a right angle to the extrusion direction. The cut surface is examined under a scanning electron microscope so as to measure the particle diameter. The result is expressed in terms of the arithmetic mean of measurements.

Haze of Multilayered Sheet:

A specimen cut out of the multilayered sheet is coated with silicone oil and measured for haze according to ASTM D1003-61 using HR-100 made by Murakami Shikisai Gijutsu Kenkyusho.

Drop Test of Thermoformed Container:

A sample of thermoformed cup is filled with 200 cc of water. The top of the cup is closed by heat sealing with another cup (inverted). The filled cup is dropped on a concrete floor, and the height for the cup to break (allowing water to leak) is recorded. This test is repeated for 30 samples and the results are calculated according to JIS K7211 (Section 8 for calculations) to obtain the height for 50% of the samples to break.

Peel Strength of Thermoformed Container:

A specimen (15 mm wide) is cut out of a thermoformed cup (at its flange). The specimen is subjected to the T-peel test at a peel speed of 250 mm/min.

Oxygen Permeability of Multilayered Film:

A specimen cut out of the multilayered film is conditioned at 20° C. and 65% RH and measured for oxygen permeability using an oxygen permeability measuring apparatus (OX-TRAN-10/50A, made by Modern Control Co., Ltd. Results are expressed in terms of $ml/m^2 \cdot day \cdot atm$.

Flexure Resistance Test of Multilayered Film:

A specimen (12×8 inches) is cut out of the multilayered film and conditioned at 20° C. and 65% RH. The specimen is made into a cylinder, 3.5 inches in diameter. The cylinder is held by grips at its ends on a Gelbo Flex Tester (made by Rigaku Kogyo). Initially, the grips are 7 inches apart. The specimen is twisted by turning the grips in the opposite direction through an angle of 440° such that the distance between the grips is decreased to 3.5 inches. Then the grips are moved straight and horizontally so that the distance between them is decreased to 2.5 inches. Finally, the grips are returned to their original positions. (When the specimen is flexed to the utmost limit, the grips are 1 inch apart.) These steps are repeated at a rate of 40 cycles per minute. The specimen is observed after 500 cycles each, and the cycles are repeated (up to 10,000 cycles) until pinholes appear in the specimen. This test is carried out at 20° C. and 65% RH.

Drop Test of Flexible Container:

A sample of flexible container is prepared from the multilayered film by heat sealing. The sample is filled with water and dropped on a concrete floor. The height at which the container breaks (allowing water to leak) is recorded. This test is repeated for 30 samples and the results are calculated according to JIS K7211 (Section 8 for calculations) to obtain the height for 50% of the samples to break.

EXAMPLE 1-1

A dry blend was prepared from the following three components.

(A) Ethylene-α-olefin copolymer produced by a single-site catalyst, "Affinity FM1570" from Dow Chemical. (80 parts by weight)

Comonomer=1-octene (7.5 wt. %)

Density=0.915 $g/cm^3$

MFR=1.0 g/10 min (210° C., 2,160 g load)

Mw/Mn=3.6

(B) EVOH (20 parts by weight)

Ethylene content=32 mol. %

Degree of hydrolysis=99.6%

MFR=3.1 g/10 min (210° C., 2,160 g load)

Content of phosphorus compound (potassium dihydrogenphosphate)=100 ppm (in terms of elemental phosphorus)

Content of sodium salt (sodium acetate)=65 ppm (in terms of elemental sodium)

(C) Carboxylic acid-modified polyolefin, "Admer NF500" from Mitsui Petrochemical Industries, Ltd. (low-density polyethylene graft-modified with maleic anhydride). (5 parts by weight)

MFR=3.6 g/10 min (210° C., 2,160 g load)

The dry blend was pelletized by extrusion through an extruder (40 mm in diameter, L/D=24, compression ratio= 3.8) having a Madock-type mixing zone. Thus there was obtained resin composition (RC) of the present invention.

A 6-layered sheet specified below was produced by coextrusion from the resin composition and the abovementioned three components fed into separate extruders. Layer construction:

(A)/(C)/(B)/(C)/(RC)/(A)=200/25/100/25/450/200 μm
Total thickness=1,000 μm.

Each component was extruded under the following conditions.

Component (A): at 200–240° C. through a 65-mm single-screw extruder with an L/D ratio of 22.

Component (B): at 170–210° C. through a 40-mm single-screw extruder with an L/D ratio of 26.0.

Component (C): at 160–220° C. through a 40-mm single-screw extruder with an L/D ratio of 26.

Resin composition: at 160–210° C. through a 40-mm single-screw extruder with an L/D ratio of 22.

The melt was discharged from a feed block die (600 mm wide) at 240' C.

The extruded sheet was observed 30 minutes and 6 hours after the start of operation. A sample taken 30 minutes after the start of operation was found to have a haze of 35%.

Observation of the cross section of the sheet under a scanning electron microscope revealed that the matrix of the ethylene-α-olefin copolymer (A) contains dispersed therein particles (1.5 μm in average diameter) of the EVOH (B) and the carboxylic acid-modified polyolefin (C).

The resulting sheet was made into cups by thermoforming under the following conditions.

Thermoforming machine: made by Asano Seisakusho
Sheet temperature: 170° C.
Mold: 70 mm in diameter, 70 mm long
Draw ratio: S=1.0
Air pressure: 5 kg/cm$^2$
Plug: 45 mm in diameter, 65 mm long, syntax form
Plug temperature: 150° C.
Mold temperature: 70° C.

The resulting cups underwent a drop test. Samples did no break when dropped from a height under 1.7 meters. The peel strength of the flange of the cup was 2.0 kg/15 mm wide (which is sufficient for practical use). The results of evaluation are shown in Tables 1 and 2.

EXAMPLE 1-2

A 5-layered sheet specified below was produced by coextrusion from the same three components (A), (B), and (C) as used in Example 1-1, which were fed into separate extruders.

Layer construction:
(A)/(C)/(B)/(C)/(A)=400/25/200/25/400 μm

This multilayered sheet was reground, and the resulting regrinds were used in place of the resin composition while repeating the procedure of Example 1-1. Samples of the sheets and cups were evaluated in the same manner as mentioned above. The results of evaluation are shown in Tables 1 and 2.

EXAMPLES 1-3, 1-4, 1-10 AND 1-16 AND COMPARATIVE EXAMPLES 1-1, 1-3 AND 1-4

The same procedure as described in Example 1-1 was repeated except that the ethylene-α-olefin copolymer (A) was replaced by any of the following products. The results are shown in Tables 1 and 2. ("Affinity" is a product from Dow Chemical produced from a single-site catalyst, and others are products produced from a conventional Ziegler catalyst).

Examples 1-16 and Comparative Examples 1-4 gave cups which are not sufficient in stiffness to retain their forms.

Examples 1-3: "Affinity PL1845" from Dow Chemical copolymer containing 9.5 wt. % 1-octene, density=0.910 g/cm$^3$ MFR=3.5 g/10 min (210° C., 2,160 g load) Mw/Mn=3.3

Example 1-4: "Affinity HF1030" from Dow Chemical copolymer containing 2.0 wt. % 1-octene, density=0.935 g/cm$^3$ MFR=2.5 g/10 min (210° C., 2,160 g load) Mw/Mn=3.8

Example 1-10: "Affinity SM1350" from Dow Chemical copolymer containing 9.5 wt. % 1-octene, density=0.913 g/cm$^3$ MFR=30 g/10 min (210° C., 2,160 g load) Mw/Mn=3.7

Example 1-16: "Affinity PF1140" from Dow Chemical copolymer containing 15 wt. % 1-octene, density=0.895 g/cm$^3$ MFR=1.6 g/10 min (210° C., 2,160 g load) Mw/Mn=3.6

Comparative Example 1-1: LLDPE "UF420" from Mitsubishi Chemical Corporation copolymer containing 4.95 wt. % 1-hexene, density=0.925 g/cm$^3$ MFR=0.8 g/10 min (210° C., 2,160 g load) Mw/Mn=7.5

Comparative Example 1-3: HDPE "Nipolon Hard" from Tosoh Corporation
density=0.953 g/cm$^3$
MFR=1.0 g/10 min (210° C., 2,160 g load)
Mw/Mn=6.8

Comparative Example 1-4: "Esprene N0372" from Sumitomo Chemical Co., Ltd.
copolymer containing 13 wt. % 1-butene, density=0.89 g/cm$^3$
MFR=3.0 g/10 min (210° C., 2,160 g load) Mw/Mn=4.6

EXAMPLES 1-5, 1-6, 1-7, 1-8 AND 1-11

The same procedure as described in Example 1-1 was repeated except the EVOH (B) was replaced by any of the following products. The results are shown in Tables 1 and 2.

Example 1-5: EVOH
Ethylene content=27 mol. %
Degree of hydrolysis=99.6%
MFR=3.9 g/10 min (210° C., 2,160 g load)
Content of phosphorus compound (potassium dihydrogenphosphate)=100 ppm (in terms of elemental phosphorus)
Content of sodium salt (sodium acetate)=65 ppm (in terms of elemental sodium)

Example 1-6: EVOH
Ethylene content=44 mol. %
Degree of hydrolysis=99.7
MFR=3.5 g/10 min (210° C., 2,160 g load)
Content of phosphorus compound (potassium dihydrogenphosphate)=100 ppm (in terms of elemental phosphorus)
Content of sodium salt (sodium acetate)=65 ppm (in terms of elemental sodium)

Example 1-7: EVOH
Ethylene content=32 mol. %
Degree of hydrolysis=99.6%
MFR=3.1 g/10 min (210° C., 2,160 g load)
Content of phosphorus compound=0 ppm
Content of sodium salt (sodium acetate)=65 ppm (in terms of elemental sodium)

Example 1-8: EVOH
  Ethylene content=32 mol. %
  Degree of hydrolysis=99.6%
  MFR=3.1 g/10 min (210° C., 2,160 g load)
  Content of phosphorus compound (potassium dihydrogenphosphate)=100 ppm (in terms of elemental phosphorus)
  Content of sodium salt (sodium acetate)=3 ppm (in terms of elemental sodium)
Example 1-11: EVOH
  Ethylene content=32 mol. %
  Degree of hydrolysis=99.6%
  MFR=33 g/10 min (210° C., 2,160 g load)
  Content of phosphorus compound (potassium dihydrogenphosphate)=100 ppm (in terms of elemental phosphorus)
  Content of sodium salt (sodium acetate)=65 ppm (in terms of elemental sodium).

COMPARATIVE EXAMPLE 1-2

The same procedure as described in Example 1-2 was repeated except that the ethylene-α-olefin copolymer (A), which was produced with a single-site catalyst and used for production of the pellets of the resin composition, was replaced by LLDPE ("UF420" from Mitsubishi Chemical Corporation), which was produced with a conventional Ziegler catalyst specified below.
  copolymer containing 4.95 wt. % 1-hexene
  density=0.925 g/cm$^3$
  MFR=0.8 g/10 min (210° C., 2,160 g load)
  Mw/Mn=7.5
The results are shown in Tables 1 and 2.

EXAMPLE 1-9

The same procedure as described in Example 1-1 was repeated except that the carboxylic acid-modified polyolefin (C) was "Admer QF500" (from Mitsui Petrochemical Industries, Ltd.) specified below in place of "Admer NF500" (from Mitsui Petrochemical Industries, Ltd.).
  Polypropylene graft-modified with maleic anhydride, MFR=3.0 g/10 min (230° C., 2,160 g load).
The results are shown in Tables 1 and 2.

EXAMPLES 1-17, 1-18 AND 1-19

The same procedure as described in Example 1-1 was repeated except that the mixing ratio of components (A), (B), and (C) was changed as follows.
  Example 1-17: (A):(B):(C)=80:20:0
  Example 1-18: (A):(B):(C)=50:50:5
  Example 1-19: (A):(B):(C)=80:20:30

COMPARATIVE EXAMPLES 1-5, 1-6 AND 1-7

The same procedure as described in Comparative Example 1-1 was repeated except that the mixing ratio of components (A), (B), and (C) was changed as follows.
  Comparative Example 1-5: (A):(B):(C)=80:20:0
  Comparative Example 1-6: (A):(B):(C)=50:50:5
  Comparative Example 1-7: (A):(B):(C)=80:20:30

EXAMPLES 1-12, 1-14 AND 1-15

The same procedure as described in Example 1-1 was repeated except that the compounds infra were incorporated in the dry blend of components (A), (B), and (C).
  Example 1-12: hydrotalcite {Mg$_{4.5}$Al$_2$(OH)$_{13}$CO$_3$.3.5H$_2$O}, 0.1 part by weight.
  Example 1-14: magnesium stearate, 0.1 part by weight.
  Example 1-15: hydrotalcite {Mg$_{4.5}$Al$_2$(OH)$_{13}$CO$_3$.3.5H$_2$O}, 0–1 part by weight; and magnesium stearate, 0.1 part by weight.

EXAMPLE 1-13

The same procedure as described in Example 1-1 was repeated except that the ethylene-α-olefin copolymer (A) was replaced by a mixture comprising 80 parts by weight of the same ethylene-α-olefin copolymer (A) as used in Example 1-1 and 0.1 part by weight of hydrotalcite {Mg$_{4.5}$Al$_2$(OH)$_{13}$CO$_3$.3.5H$_2$O). The two components were dry-blended and pelletized by extrusion through a 40-mm extruder (L/D=24, compression ratio=3.8) equipped with a Madock-type mixing zone. The results are shown in Tables 1 and 2.

TABLE 1

| | Ethylene-α-olefin copolymer (A) | | | | EVOH (B) | | | | | Modified PO (C) | | | |
|---|---|---|---|---|---|---|---|---|---|---|---|---|---|
| | Density | Mw/Mn | MFR g/10 min | Amount mol % | Ethylene Ppm | P ppm | Na ppm | MFR g/10 min | Amount pbw | Resin | Amount pbw | Additive | Note |
| Example 1-1 | 0.915 | 3.6 | 1.0 | 80 | 32 | 100 | 65 | 3.1 | 20 | Modified PE | 5 | — | |
| Example 1-2 | 0.915 | 3.6 | 1.0 | 80 | 32 | 100 | 65 | 3.1 | 20 | Modified PE | 5 | — | *1 |
| Example 1-3 | 0.910 | 3.3 | 3.5 | 80 | 32 | 100 | 65 | 3.1 | 20 | Modified PE | 5 | — | |
| Example 1-4 | 0.935 | 3.8 | 2.5 | 80 | 32 | 100 | 65 | 3.1 | 20 | Modified PE | 5 | — | |
| Example 1-5 | 0.915 | 3.6 | 1.0 | 80 | 27 | 100 | 65 | 3.9 | 20 | Modified PE | 5 | — | |
| Example 1-6 | 0.915 | 3.6 | 1.0 | 80 | 44 | 100 | 65 | 3.5 | 20 | Modified PE | 5 | — | |
| Example 1-7 | 0.915 | 3.6 | 1.0 | 80 | 32 | 0 | 65 | 3.1 | 20 | Modified PE | 5 | — | |
| Example 1-8 | 0.915 | 3.6 | 1.0 | 80 | 32 | 100 | 3 | 3.1 | 20 | Modified PE | 5 | — | |
| Example 1-9 | 0.915 | 3.6 | 1.0 | 80 | 32 | 100 | 65 | 3.1 | 20 | Modified PP | 5 | — | |
| Example 1-10 | 0.913 | 3.7 | 30 | 80 | 32 | 100 | 65 | 3.1 | 20 | Modified PE | 5 | — | |
| Example 1-11 | 0.915 | 3.6 | 1.0 | 80 | 32 | 100 | 65 | 33 | 20 | Modified PE | 5 | — | |
| Example 1-12 | 0.915 | 3.6 | 1.0 | 80 | 32 | 100 | 65 | 3.1 | 20 | Modified PE | 5 | D | |
| Example 1-13 | 0.915 | 3.6 | 1.0 | 80 | 32 | 100 | 65 | 3.1 | 20 | Modified PE | 5 | D | *2 |
| Example 1-14 | 0.915 | 3.6 | 1.0 | 80 | 32 | 100 | 65 | 3.1 | 20 | Modified PE | 5 | E | |
| Example 1-15 | 0.915 | 3.6 | 1.0 | 80 | 32 | 100 | 65 | 3.1 | 20 | Modified PE | 5 | D + E | |
| Example 1-16 | 0.895 | 3.6 | 1.6 | 80 | 32 | 100 | 65 | 3.1 | 20 | Modified PE | 5 | | |
| Example 1-17 | 0.915 | 3.6 | 1.0 | 80 | 32 | 100 | 65 | 3.1 | 20 | — | — | | |
| Example 1-18 | 0.915 | 3.6 | 1.0 | 50 | 32 | 100 | 65 | 3.1 | 50 | Modified PE | 5 | | |
| Example 1-19 | 0.915 | 3.6 | 1.0 | 80 | 32 | 100 | 65 | 3.1 | 20 | Modified PE | 30 | | |

TABLE 1-continued

| | Ethylene-α-olefin copolymer (A) | | | | EVOH (B) | | | | | Modified PO (C) | | Additive | Note |
|---|---|---|---|---|---|---|---|---|---|---|---|---|---|
| | Density | Mw/Mn | MFR g/10 min | Amount mol % | Ethylene Ppm | P ppm | Na ppm | MFR g/10 min | Amount pbw | Resin | Amount pbw | | |
| Comparative Example 1-1 | 0.925 | 7.5 | 0.8 | 80 | 32 | 100 | 65 | 3.1 | 20 | Modified PE | 5 | — | |
| Comparative Example 1-2 | 0.925 | 7.5 | 0.8 | 80 | 32 | 100 | 65 | 3.1 | 20 | Modified PE | 5 | — | *1 |
| Comparative Example 1-3 | 0.953 | 6.8 | 1.0 | 80 | 32 | 100 | 65 | 3.1 | 20 | Modified PE | 5 | — | |
| Comparative Example 1-4 | 0.89 | 4.6 | 3.0 | 80 | 32 | 100 | 65 | 3.1 | 20 | Modified PE | 5 | — | |
| Comparative Example 1-5 | 0.925 | 7.5 | 0.8 | 80 | 32 | 100 | 65 | 3.1 | 20 | — | — | — | |
| Comparative Example 1-6 | 0.925 | 7.5 | 0.8 | 50 | 32 | 100 | 65 | 3.1 | 50 | Modified PE | 5 | — | |
| Comparative Example 1-7 | 0.925 | 7.5 | 0.8 | 80 | 32 | 100 | 65 | 3.1 | 20 | Modified PE | 30 | — | |

*1 Regrinds, *2 Blended pellets.

TABLE 2

| | Characteristics of sheet | | | | Characteristics of thermoformed articles | |
|---|---|---|---|---|---|---|
| | Appearance | | Dia. Of dispersed particles | | Dropping height | Peel strength |
| | 30 min later | 6 hours later | (μm) | Haze (%) | (m) | kg/15 mm width |
| Example 1-1 | A | B | 1.5 | 35 | 1.7 | 2.0 |
| Example 1-2 | B | B | 1.7 | 39 | 1.6 | 1.8 |
| Example 1-3 | A | B | 1.4 | 30 | 2.0 | 2.1 |
| Example 1-4 | A | B | 1.6 | 41 | 1.6 | 1.8 |
| Example 1-5 | A | B | 1.6 | 37 | 1.6 | 1.7 |
| Example 1-6 | A | B | 1.7 | 33 | 1.8 | 2.2 |
| Example 1-7 | A | C | 1.6 | 39 | 1.6 | 2.0 |
| Example 1-8 | B | B | 1.7 | 40 | 1.5 | 1.4 |
| Example 1-9 | B | B | 1.9 | 45 | 1.4 | 1.6 |
| Example 1-10 | B | B | 2.5 | 51 | 1.3 | 1.6 |
| Example 1-11 | B | B | 2.3 | 49 | 1.4 | 1.7 |
| Example 1-12 | A | A | 1.4 | 43 | 1.8 | 2.1 |
| Example 1-13 | A | A | 1.5 | 46 | 1.9 | 2.2 |
| Example 1-14 | A | A | 1.5 | 33 | 1.7 | 2.1 |
| Example 1-15 | A | A | 1.3 | 46 | 1.8 | 2.3 |
| Example 1-16 | B | B | 1.6 | 22 | 2.3 | 2.2 |
| Example 1-17 | C | D | 3.2 | 70 | 0.9 | 0.6 |
| Example 1-18 | B | C | 1.7 | 47 | 1.1 | 1.5 |
| Example 1-19 | C | D | 1.8 | 40 | 1.3 | 2.3 |
| Comparative Example 1-1 | A | B | 1.6 | 54 | 1.4 | 1.4 |
| Comparative Example 1-2 | B | B | 1.8 | 60 | 1.3 | 1.2 |
| Comparative Example 1-3 | B | B | 1.9 | 68 | 1.1 | 0.8 |
| Comparative Example 1-4 | B | C | 2.0 | 31 | 2.0 | 1.6 |
| Comparative Example 1-5 | D | D | 4.1 | 82 | 0.6 | 0.4 |
| Comparative Example 1-6 | C | C | 2.2 | 56 | 0.8 | 1.1 |
| Comparative Example 1-7 | D | D | 2.5 | 49 | 1.1 | 2.0 |

EXAMPLE 2-1

A dry blend was prepared from the following two components.
- (A) Ethylene-α-olefin copolymer produced with a single-site catalyst, "Engage EG8100" from Dow Chemical. (10 parts by weight)
  Comonomer=1-octene (24 wt. %)
  Density=0.87 g/cm$^3$
  MFR=1.0 g/10 min (210° C., 2,160 g load)
  Mw/Mn=3.7
- (C) Carboxylic acid-modified polyolefin, "Admer NF500" from Mitsui Petrochemical Industries, Ltd. (LLDPE graft-modified with maleic anhydride). (5 parts by weight)
  MFR=3.6 g/10 min (210° C., 2,160 g load)

The dry blend was pelletized by extrusion through an extruder (40 mm in diameter, L/D=24, compression ratio=3.8) having a Madock-type mixing zone. Thus there was obtained the resin composition (pellets) of the present invention.

Then, 15 parts by weight of the resin composition was mixed with 90 parts by weight of EVOH (B) specified below by extrusion under the same conditions as above.
- Ethylene content=32 mol. %
- Degree of hydrolysis=99.6%
- MFR=3.1 g/10 min (210° C., 2,160 g load)
- Content of phosphorus compound (potassium dihydrogenphosphate)=100 ppm (in terms of elemental phosphorus)

Content of potassium=125 ppm (in terms of elemental potassium)

Content of sodium salt (sodium acetate)=65 ppm (in terms of elemental sodium)

Thus there was obtained the desired resin composition comprising three resin components.

A 5-layered film specified below was produced by coextrusion from the resin composition and the following two components were fed into separate extruders.

Layer Construction:

LLDPE/AD/RC/AD/LLDPE=50/5/20/5/50 μm

Total thickness=130 μm

LLDPE: Ethylene-α-olefin copolymer produced with a conventional Ziegler catalyst ("US420" from Mitsubishi Chemical Corporation)

density=0.925 g/cm$^3$

MFR=0.8 g/10 min (210° C., 2,160 g load)

AD: Linear low-density polyethylene graft-modified with maleic anhydride for the adhesive resin layer ("Admer NF500" from Mitsui Petrochemical Industries, Ltd.)

MFR=3.6 g/10 min (210° C., 2,160 g load)

Each component was extruded under the following conditions.

LLDPE: at 200–240° C. through a 65-mm single-screw extruder with an L/D ratio of 22.

AD: at 160–220° C. through a 40-mm single-screw extruder with an L/D ratio of 26.

Resin composition: at 200–240° C. through a 40-mm single-screw extruder with an L/D ratio of 26. The melt was discharged from a feed block die (600 mm wide) at 240° C.

A sample of the resulting multilayered film was cooled with liquid nitrogen and its cross section was observed under a scanning electron microscope. It was found that the EVOH (B) contains particles of the ethylene-α-olefin copolymer (A) and the carboxylic acid-modified polyolefin (C) dispersed therein and having an average particle diameter of 1.6 μm (arithmetic mean).

After conditioning at 20° C. and 65% RH, the multilayered film was tested for oxygen permeability using OX-TRAN-10/50A made by Modern Control.

A specimen (12×8 inches) was cut out of the multilayered film and conditioned at 20° C. and 65% RH. The specimen was made into a cylinder, 3.5 inches in diameter. The cylinder was held by grips at its ends on a Gelbo Flex Tester (made by Rigaku Kogyo). Initially, the grips were 7 inches apart. The specimen was twisted by turning the grips in the opposite direction through an angle of 440° such that the distance between the grips was decreased to 3.5 inches. Then the grips were moved straight and horizontally so that the distance between them was decreased to 2.5 inches. Finally, the grips were returned to their original positions. (When the specimen was flexed to the utmost limit, the grips were 1 inch apart.) These steps were repeated at a rate of 40 cycles per minute. The specimen was observed after 500 cycles each, and the cycles were repeated (up to 10,000 cycles) until pinholes appeared in the specimen. This test was carried out at 20° C. and 65% RH.

A sample of flexible container was prepared by heat sealing from the multilayered film. (Two sheets of film measuring 20 by 30 cm were placed one over the other and three sides were heat-sealed, with the 20-cm side left open.) This sample was filled with water (20° C.) and the open side was heat-sealed. In this way there was obtained a flexible container for bag-in-box. This container was dropped on a concrete floor. The height at which the container breaks (allowing water to leak) was recorded. This test was repeated for 30 samples and the results were calculated according to JIS K7211 (Section 8 for calculations) to obtain the height for 50% of the samples to break. The results are shown in Table 3.

COMPARATIVE EXAMPLE 2-1

The procedure of Example 2-1 was repeated to produce film and flexible container except that the layer of the resin composition was replaced by one formed from only the same EVOH as used in Example 2-1. The results are shown in Table 3.

EXAMPLES 2-2, 2-3 AND 2-4

The procedure of Example 2-1 was repeated to prepare the resin composition (pellets) from the ethylene-α-olefin copolymer (A) and EVOH (B) except that their mixing ratio (A)/(B) by weight was changed to 5/95 (in Example 2-2), 20/80 (in Example 2-3), and 50/50 (in Example 2-4). Using this resin composition, films and flexible containers were prepared in the same manner as described in Example 2-1. The results are shown in Table 3.

EXAMPLES 2-5 AND 2-6

The same procedure as described in Example 2-1 was repeated except the EVOH (B) was replaced by any of the following products. The results are shown in Table 3.

Example 2-5: EVOH

Ethylene content=27 mol. %

Degree of hydrolysis=99.6%

MFR=3.9 g/10 min (210° C., 2,160 g load)

Content of phosphorus compound (potassium dihydrogenphosphate) 100 ppm (in terms of elemental phosphorus)

Content of potassium=125 ppm (in terms of elemental potassium)

Content of sodium salt (sodium acetate)=65 ppm (in terms of elemental sodium)

Example 2-6: EVOH

Ethylene content=44 mol. %

Degree of hydrolysis=99.7%

MFR=3.5 g/10 min (210° C., 2,160 g load)

Content of phosphorus compound (potassium dihydrogenphosphate)=100 ppm (in terms of elemental phosphorus)

Content of potassium=125 ppm (in terms of elemental potassium)

Content of sodium salt (sodium acetate)=65 ppm (in terms of elemental sodium)

EXAMPLE 2-7 AND 2-8 AND COMPARATIVE EXAMPLES 2-2 TO 2-4

The same procedure as described in Example 2-1 was repeated except that the ethylene-α-olefin copolymer (A) was replaced by any of the following products. Incidentally, the resins used in Example 2-7 and 2-8 are those which are produced with a single-site catalyst, and the resins used in Comparative Examples 2-2 to 2-4 are those which are produced with a conventional Ziegler catalyst. The results are shown in Table 3.

Example 2-7

"Engage CL8003" from Dow Chemical copolymer containing 18 wt. % 1-octene, density=0.885 g/cm$^3$ MFR=1.0 g/10 min (210° C., 2,160 g load)

Mw/Mn=3.4

Example 2-8
  "Engage FM1570" from Dow Chemical ethylene-α-olefin copolymer containing 7.5 wt. % 1-octene, density=0.915 g/cm³
  MFR=1.0 g/10 min (210° C., 2,160 g load)
  Mw/Mn=3.6
Comparative Example 2-2
  "Esprene N0372" from Sumitomo Chemical Co., Ltd. copolymer containing 13 wt. % 1-butene, density=0.89 g/cm³
  MFR=3.0 g/10 min (210° C., 2,160 g load)
  Mw/Mn=4.6
Comparative Example 2-3
  "V0111" from Sumitomo Chemical ethylene-propylene copolymer containing 22 wt. % propylene, density=0.87 g/cm³
  MFR=0.9 g/10 min (210° C., 2,160 g load)
  Mw/Mn=4.3
Comparative Example 2-4
  "UF420" from Mitsubishi Chemical Corporation ethylene-α-olefin copolymer containing 4.95 wt. % 1-hexene, density=0.925 g/cm³
  MFR=0.8 g/10 min (210° C., 2,160 g load)
  Mw/Mn=7.5

EXAMPLE 2-9 AND 2-10

The same procedure as described in Example 2-1 was repeated except that the ethylene-α-olefin copolymer (A) and EVOH (B) were replaced by any of the following products. Incidentally, the ratio of Ma/Mb was 0.03 (in Example 2-9) and 23.1 (in Example 2-10), wherein Ma stands for MFR of the ethylene-α-olefin copolymer (A) and Mb stands for MFR of the EVOH (B). The results are shown in Table 3.

Example 2-9
  (A): ethylene-α-olefin copolymer (the same one as used in Example 2-1.
  (B): EVOH
    Ethylene content=32 mol. %
    Degree of hydrolysis=99.6%
    MFR=33 g/10 min (210° C., 2,160 g load)
    Content of phosphorus compound (potassium dihydrogenphosphate)=100 ppm (in terms of elemental phosphorus)
    Content of potassium=125 ppm (in terms of elemental potassium)
    Content of sodium salt (sodium acetate)=65 ppm (in terms of elemental sodium)

Example 2-10
  (A): "Engage SM1250" from Dow Chemical which was produced with a single-site catalyst copolymer containing 19 wt. % 1-octene, density=0.885 g/cm³
    MFR=30 g/10 min (210° C., 2,160 g load)
    Mw/Mn=3.5
  (B): EVOH
    Ethylene content=32 mol. %
    Degree of hydrolysis=99.6%
    MFR=3.1 g/10 min (2100, 2,160 g load)
    Content of phosphorus compound (potassium dihydrogenphosphate)=100 ppm (in terms of elemental phosphorus)
  Content of sodium salt (sodium acetate)=65 ppm (in terms of elemental sodium)

EXAMPLE 2-11

The same procedure as described in Example 2-1 was repeated except that the ethylene-α-olefin copolymer (A), EVOH (B), and carboxylic acid-modified polyolefin (C) were dry-blended and they were extruded all at once. The results are shown in Table 3.

EXAMPLE 2-12

The same procedure as described in Example 2-1 was repeated except that the ethylene-α-olefin copolymer (A) and EVOH (B) were extruded all at once, excluding the carboxylic acid-modified polyolefin (C). The results are shown in Table 3.

COMPARATIVE EXAMPLE 2-5

The same procedure as described in Comparative Example 2-2 was repeated except that the ethylene-α-olefin copolymer (A) and EVOH (B) were extruded all at once, excluding the carboxylic acid-modified polyolefin (C). The results are shown in Table 3.

TABLE 3

| | Ethylene-α-olefin copolymer (A) | | | | EVOH (B) | | | Modified | | | Occur- | Breaking |
|---|---|---|---|---|---|---|---|---|---|---|---|---|
| | Density | Mw/Mn | Ml g/10 min. | Amount pbw | Ethylene content mol % | Ml g/10 min | Amount pbw | PE (C) Amount pbw | Dispersed particle (μm) | Oxygen permeability ml/m² · day · atm | rence of pinholes (times) | drop height (m) |
| Comparative Example 2-1 | — | — | — | 0 | 32 | 3.1 | 100 | 0 | — | 0.4 | 500 | 1.2 |
| Example 2-2 | 0.87 | 3.7 | 1.0 | 5 | 32 | 3.1 | 95 | 5 | 1.5 | 0.5 | 7000 | 2.6 |
| Example 2-1 | 0.87 | 3.7 | 1.0 | 10 | 32 | 3.1 | 90 | 5 | 1.6 | 0.5 | 8500 | 3.2 |
| Example 2-3 | 0.87 | 3.7 | 1.0 | 20 | 32 | 3.1 | 80 | 5 | 1.6 | 0.7 | 10000 | 3.3 |
| Example 2-4 | 0.87 | 3.7 | 1.0 | 50 | 32 | 3.1 | 50 | 5 | (*1) | 30 | 10000 | 3.5 |
| Example 2-5 | 0.87 | 3.7 | 1.0 | 10 | 27 | 3.9 | 90 | 5 | 1.7 | 0.4 | 7500 | 2.8 |
| Example 2-6 | 0.87 | 3.7 | 1.0 | 10 | 44 | 3.5 | 90 | 5 | 1.5 | 1.7 | 10000 | 3.4 |
| Example 2-7 | 0.885 | 3.4 | 1.0 | 10 | 32 | 3.1 | 90 | 5 | 1.5 | 0.5 | 7000 | 2.8 |
| Comparative Example 2-2 | 0.89 | 4.6 | 3.0 | 10 | 32 | 3.1 | 90 | 5 | 1.9 | 0.6 | 4500 | 2.3 |
| Comparative Example 2-3 | 0.87 | 4.3 | 0.9 | 10 | 32 | 3.1 | 90 | 5 | 1.8 | 0.6 | 4000 | 2.2 |
| Example 2-8 | 0.915 | 3.6 | 1.0 | 10 | 32 | 3.1 | 90 | 5 | 1.7 | 0.5 | 1500 | 1.6 |

TABLE 3-continued

| | Ethylene-α-olefin copolymer (A) | | | | EVOH (B) | | | Modified PE (C) Amount pbw | Dispersed particle (μm) | Oxygen permeability ml/m² · day · atm | Occurrence of pinholes (times) | Breaking drop height (m) |
|---|---|---|---|---|---|---|---|---|---|---|---|---|
| | Density | Mw/Mn | Ml g/10 min. | Amount pbw | Ethylene content mol % | Ml g/10 min | Amount pbw | | | | | |
| Comparative Example 2-4 | 0.925 | 7.5 | 0.8 | 10 | 32 | 3.1 | 90 | 5 | 2.0 | 0.7 | 1000 | 1.4 |
| Example 2-9 | 0.87 | 3.7 | 1.0 | 10 | 32 | 33 | 90 | 5 | 3.2 | 1.0 | 5000 | 1.8 |
| Example 2-10 | 0.885 | 3.5 | 30 | 10 | 32 | 1.3 | 90 | 5 | 3.1 | 0.9 | 5500 | 2.1 |
| Example 2-11 | 0.87 | 3.7 | 1.0 | 10 | 32 | 3.1 | 90 | 5 | 1.8 | 0.6 | 7000 | 3.0 |
| Example 2-12 | 0.87 | 3.7 | 1.0 | 10 | 32 | 3.1 | 90 | 0 | 2.0 | 0.8 | 2500 | 2.0 |
| Comparative Example 2-5 | 0.89 | 4.6 | 3.0 | 10 | 32 | 3.1 | 90 | 0 | 2.7 | 1.2 | 1000 | 1.4 |

*1 The compounded resins dispersed in a reticulate state.

The present invention provides a resin composition which is superior in melt moldability, gas barrier properties, flexural fatigue resistance, and impact resistance. This resin composition can be used in a multilayered structure to impart a good appearance, transparency, impact resistance, delamination resistance, gas barrier properties and flexural fatigue resistance.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A resin composition which comprises a copolymer (A) comprising ethylene as a major component produced by using a single-site catalyst, and an ethylene-vinyl alcohol copolymer (B) having an ethylene content of 20 to 60 mol % and a degree of hydrolysis of 95% or above, wherein the ethylene-vinyl alcohol copolymer (B) contains a boron compound in an amount of 20 to 2000 ppm in terms of boron, said resin composition satisfying the following equation (1):

$$1/99 \leq \{\text{weight of (A)}\}/\{\text{weight of (B)}\} \leq 99/1 \quad (1).$$

2. The resin composition as claimed in claim 1, wherein the copolymer (A) is an ethylene-α-olefin copolymer in which the α-olefin has 3 to 8 carbon atoms.

3. The resin composition as claimed in claim 1, wherein the copolymer (A) is an ethylene-α-olefin copolymer in which the α-olefin has an ethylene content of 50 wt. % or more.

4. The resin composition as claimed in claim 1, wherein the copolymer (A) has a molecular weight distribution (Mw/Mn) of not greater than 4.

5. The resin composition as claimed in claim 1, wherein the ethylene-vinyl alcohol copolymer (B) contains a phosphorus compound in an amount of 2 to 200 ppm in terms of phosphorus element.

6. The resin composition as claimed in claim 1, wherein the ethylene-vinyl alcohol copolymer (B) contains an alkali metal salt in an amount of 5 to 5000 ppm in terms of elemental alkali metal.

7. The resin composition as claimed in claim 1, wherein the copolymer (A) has a density of 0.90 to 0.94 g/cm³ and the resin composition further comprises a carboxylic acid-modified polyolefin (C) and satisfies the following equations (2) and (3):

$$60/40 \leq \{\text{weight of (A)}\}/\{\text{weight of (B)}\} \leq 99/1 \quad (2)$$

$$0.1/99.9 \leq X \leq 20/80 \quad (3)$$

wherein X={weight of (C)}/{total weight of (A) and (B)}.

8. The resin composition as claimed in claim 7, wherein resin particles comprising the ethylene-vinyl alcohol copolymer (B) and the carboxylic acid-modified polyolefin (C) are dispersed in a matrix of the copolymer (A), and have an average particle diameter not greater than 5 μm.

9. The resin composition as claimed in claim 1, wherein a melt flow rate Ma of the copolymer (A) and a melt flow rate Mb of the ethylene-vinyl alcohol copolymer (B) satisfy the following equation (4):

$$0.05 \leq Ma/Mb \leq 5 \quad (4)$$

10. The resin composition as claimed in claim 1, which further comprises a hydrotalcite compound (D) in an amount of 0.0001 to 2% based on the total weight of (A) and (B).

11. The resin composition as claimed in claim 1, which further comprises a metal salt of higher aliphatic carboxylic acid (E) in an amount of 0.0001 to 2% based an the total weight of (A) and (B).

12. A multilayered structure which comprises a layer of the resin composition as claimed in claim 1, and a layer of an ethylene-vinyl alcohol copolymer having an ethylene content of 20 to 60 mol % and a degree of hydrolysis of 95% or above.

13. The multilayered structure as claimed in claim 12, which further comprises at least one layer comprising an ethylene-α-olefin copolymer produced by using a single-site catalyst and having a density of 0.90 to 0.94 g/cm³, in which the α-olefin has 3 to 8 carbon atoms, and at least one layer comprising a carboxylic acid-modified polyolefin.

14. The multilayered structure as claimed in claims 12, which is formed by coextrusion.

15. A resin composition which comprises a copolymer (A) comprising ethylene as a major component produced by using a single-site catalyst, and an ethylene-vinyl alcohol copolymer (B) having an ethylene content of 20 to 60 mol % and a degree of hydrolysis of 95% or above, said resin composition satisfying the following equation (1):

$$1/99 \leq \{\text{weight of (A)}\}/\{\text{weight of (B)}\} \leq 99/1 \quad (11).$$

16. The resin composition as claimed in claim 15, wherein the copolymer (A) is an ethylene-α-olefin copolymer in which the α-olefin has 3 to 8 carbon atoms.

17. The resin composition as claimed in claim 15, wherein the copolymer (A) is an ethylene-α-olefin copolymer in which the α-olefin has an ethylene content of 50 wt. % or more.

18. The resin composition as claimed in claim 15, wherein the copolymer (A) has a molecular weight distribution (Mw/Mn) of not greater than 4.

19. The resin composition as claimed in claim 15, wherein the ethylene-vinyl alcohol copolymer (B) contains a phosphorus compound in an amount of 2 to 200 ppm in terms of phosphorus element.

20. The resin composition as claimed in claim 15, wherein the ethylene-vinyl alcohol copolymer (B) contains an alkali metal salt in an amount of 5 to 5000 ppm in terms of elemental alkali metal.

21. The resin composition as claimed in claim 15, wherein the copolymer (A) has a density of 0.90 to 0.94 g/cm$^3$ and the resin composition further comprises a carboxylic acid-modified polyolefin (C) and satisfies the following equations (2) and (3):

$$60/40 \leq \{\text{weight of (A)}\}/\{\text{weight of (B)}\} \leq 99/1 \quad (2)$$

$$0.1/99.9 \leq X \leq 20/80 \quad (3)$$

wherein X={weight of (C)}/{total weight of(A) and (B)}.

22. The resin composition as claimed in claim 21, wherein resin particles comprising the ethylene-vinyl alcohol copolymer (B) and the carboxylic acid-modified polyolefin (C) are dispersed in a matrix of the copolymer (A), and have an average particle diameter not greater than 5 μm.

23. The resin composition as claimed in claim 15, wherein a melt flow rate Ma of the copolymer (A) and a melt flow rate Mb of the ethylene-vinyl alcohol copolymer (B) satisfy the following equation (4):

$$0.05 \leq Ma/Mb \leq 5. \quad (4)$$

24. The resin composition as claimed in claim 15, which further comprises a hydrotalcite compound (D) in an amount of 0.0001 to 2% based on the total weight of (A) and (B).

25. The resin composition as claimed in claim 15, which further comprises a metal salt of higher aliphatic carboxylic acid (E) in an amount of 0.0001 to 2% based on the total weight of (A) and (B).

26. A multilayered structure which comprises a layer of the resin composition as claimed in claim 15 and a layer of an ethylene-vinyl alcohol copolymer having an ethylene content of 20 to 60 mol % and a degree of hydrolysis of 95% or above.

27. The multilayered structure as claimed in claim 26, which further comprises at least one layer comprising an ethylene-α-olefin copolymer produced by using a single-site catalyst and having a density of 0.90 to 0.94 g/cm$^3$, in which the α-olefin has 3 to 8 carbon atoms, and at least one layer comprising a carboxylic acid-modified polyolefin.

28. The multilayered structure as claimed in claim 26, which is formed by coextrusion.

* * * * *